(12) United States Patent
Pfau et al.

(10) Patent No.: US 8,423,304 B2
(45) Date of Patent: Apr. 16, 2013

(54) THERMAL, FLOW MEASURING DEVICE

(75) Inventors: Axel Pfau, Arlesheim (CH); Vivek Kumar, Muttenz (CH); Anastasios Badarlis, Birsfelden (SE)

(73) Assignee: Endress + Hauser Flowtec AG, Reinach (CH)

( * ) Notice: Subject to any disclaimer, the term of this patent is extended or adjusted under 35 U.S.C. 154(b) by 344 days.

(21) Appl. No.: 12/926,014

(22) Filed: Oct. 21, 2010

(65) Prior Publication Data

US 2011/0098943 A1  Apr. 28, 2011

(30) Foreign Application Priority Data

Oct. 23, 2009 (DE) .......................... 10 2009 045 955

(51) Int. Cl.
*G01F 1/68* (2006.01)
(52) U.S. Cl.
USPC .......................................................... 702/47

(58) Field of Classification Search ............... 702/47, 702/49, 182–185
See application file for complete search history.

(56) References Cited

U.S. PATENT DOCUMENTS 4,932,268 A * 6/1990 Hafner ....................... 73/861.12

* cited by examiner

*Primary Examiner* — Edward Raymond
(74) *Attorney, Agent, or Firm* — Bacon & Thomas, PLLC

(57) ABSTRACT

Thermal, flow measuring device and method for operating a thermal, flow measuring device, wherein the thermal, flow measuring device has a first sensor with a first heatable resistance thermometer and at least an additional, second sensor with a second heatable resistance thermometer. A decision coefficient is calculated according to the formula $DC=(PC_1-PC_2)/PC_1$, with $PC_1(t=t_1)=P_{1,1}(t_1)/(T_{1,heated;actual}(t=t_1)-T_{medium;actual}(t=t_1))$ and $PC_2(t=t_2)=P_{2,2}(t_2)/(T_{2,heated;actual}(t=t_2)-T_{medium;actual}(t=t_2))$, with P being the heating powers consumed by the corresponding resistance thermometers at the points in time t, and T being the temperature values; wherein the value of the decision coefficient indicates the flow direction of a measured medium in the measuring tube.

15 Claims, 2 Drawing Sheets

THERMAL, FLOW MEASURING DEVICE

TECHNICAL FIELD

The present invention relates to a thermal, flow measuring device and to a method for registering with the thermal, flow measuring device the flow and flow direction of a measured medium in a measuring tube, wherein the thermal, flow measuring device has a first heatable resistance thermometer and a second heatable resistance thermometer, which lie in a plane which is essentially perpendicular to the measuring tube axis.

BACKGROUND DISCUSSION

Conventional thermal, flow measuring devices usually use two temperature sensors which are embodied as equally as possible, and which are arranged in (most often pin-shaped) metal shell housings—so-called stingers—and which are in thermal contact with the medium flowing through a measuring tube or through the pipeline. For industrial application, the two temperature sensors are usually installed in a measuring tube; the temperature sensors can, however, also be installed directly in the pipeline. One of the two temperature sensors is a so-called active temperature sensor, which is heated by means of a heating unit. As the heating unit, either an additional resistance heating is provided, or the temperature sensor itself is a resistance element—e.g. an RTD (Resistance Temperature Device) sensor—which is heated through conversion of electrical power, e.g. through a corresponding variation in the electrical measuring current. The second temperature sensor is a so-called passive temperature sensor; it measures the temperature of the medium.

In a thermal, flow measuring device, the heatable temperature sensor is usually heated in such a way, that a fixed temperature difference arises between the two temperature sensors. Alternatively, it is also known to supply a constant heating power via a control unit.

If there is no flow in the measuring tube, an amount of heat which is constant in time is then required for maintaining the predetermined temperature difference. If, in contrast, the medium to be measured is in movement, the cooling of the heated temperature sensor is essentially dependent on the mass flow of the medium flowing past. Since the medium is colder than the heated temperature sensor, heat from the heated temperature sensor is transported away by the flowing medium. In order to then maintain the fixed temperature difference between the two temperature sensors in the case of a flowing medium, an increased heating power is required for the heated temperature sensor. The increased heating power is a measure for the mass flow, e.g. mass flow rate, of the medium through the pipeline.

If, in contrast, a constant heating power is fed in, the temperature difference existing between the two temperature sensors as a result of the flow of the medium is lessened. The particular temperature difference is then a measure for the mass flow of the medium through the pipeline or through the measuring tube.

There is, thus, a functional relationship between the heating energy needed for heating the temperature sensor and the mass flow through a pipeline or through a measuring tube. The dependence of the so-called heat transfer coefficient on the mass flow of the medium through the measuring tube or through the pipeline is utilized in thermal, flow measuring devices for determining the mass flow. Devices which operate according to this principle are available from the assignee under the names "t-switch", "t-trend" and "t-mass".

Until now, mainly RTD-elements with helically wound, platinum wires were applied in thermal, flow measuring devices. In the case of thin-film, resistance thermometers (TFRTDs), a meander-shaped, platinum layer is conventionally vapor-deposited onto a substrate. Over this is applied a further, glass layer, for protecting the platinum layer. The cross section of thin-film, resistance thermometers is rectangular, in contrast to RTD elements, which have a round cross section. The heat transfer into the resistance element and/or from the resistance element accordingly occurs via two oppositely lying surfaces, which together make up a large part of the total surface of a thin-film, resistance thermometer.

EP 0 024 327 and U.S. Pat. No. 4,083,244 show different embodiments of thermal, flow measuring devices. These can also ascertain flow direction. In this regard, flow-conditioning bodies are arranged in the flow in front of a temperature sensor.

SUMMARY OF THE INVENTION

An object of the invention is to provide a thermal, flow measuring device, with which the flow direction of the measured medium is easily ascertainable.

The object is achieved by a thermal, flow measuring device for determining and/or monitoring the flow of a measured medium through a measuring tube, wherein the thermal, flow measuring device includes a first heatable resistance thermometer and a second heatable resistance thermometer, which lie in a plane which is essentially perpendicular to the measuring tube axis; wherein a plate is arranged in the measuring tube on a connecting line between the first heatable resistance thermometer and the second heatable resistance thermometer; wherein the plate has a vertical axis and a longitudinal axis; wherein the plate is arranged in the measuring tube in such a manner, that the longitudinal axis forms a first angle of between 30° and 60° with the measuring tube axis, and the vertical axis intersects the connecting line approximately perpendicularly and intersects the plane at a second angle of between −30° and +30°.

The plane and the connecting line are, in such case, purely imaginary, and the resistance thermometers contact the imaginary plane and the imaginary connecting line at at least one point. The vertical and the longitudinal axes of the plate are, in each case, axes of symmetry, and they are perpendicular to one another. In an embodiment, the vertical and the longitudinal axes intersect in the center of gravity of the plate. The imaginary connecting line between the first and second resistance thermometers intersects the vertical axis of the plate at a point. In a form of embodiment, the longitudinal axis of the plate also intersects the connecting line between the first and second resistance thermometer at a point.

The thermal, flow measuring device thus includes a first and at least an additional, second sensor. In a further development of the invention, the first sensor includes a first heatable resistance thermometer in a first pin-shaped housing, and the second sensor includes a second heatable resistance thermometer in a second pin-shaped housing. The pin-shaped housings can, for example, protrude into the measuring tube parallel to one another. The plate is located then between the first pin-shaped housing and the second pin-shaped housing, and is, for example, arranged in the measuring tube in such a way, that the vertical axis is parallel to the central axes of the first and second pin-shaped housings, and wherein the longitudinal axis forms an angle of between 30° and 60° with the measuring tube axis.

In a first further development of the thermal, flow measuring device of the invention, the first angle between the longitudinal axis of the plate and the measuring tube axis amounts to 45°. In an additional embodiment, the first angle is variable as a function of the measured flow velocity. The first angle can thus be changed if the flow velocity changes. The plate is, in such case, positioned in the measuring tube is such a way that the plate can rotate about its vertical axis.

Further developed, the thermal, flow measuring device includes a third sensor, with which the value of the temperature of the measured medium is measurable. This sensor includes, for example, a third resistance thermometer in a third housing, and it protrudes into the measuring tube, wherein the distance to the first sensor amounts to at least 5 times the distance of the first sensor from the second sensor. It is thus arranged in the measuring tube far away from the plate, in a region of the flow of the measured medium undisturbed, or unconditioned, by the plate. For example, the third sensor intersects the measuring tube axis; that is to say, a central axis of the third housing intersects the measuring tube axis. Alternatively, the third sensor is emplaced in a region of the flow undisturbed by the plate, e.g. closer to the measuring tube wall. For example, the third housing is essentially shorter than the first and/or the second housing(s), this thus meaning that the third resistance thermometer then has a greater distance from the measuring tube axis than do the first and/second resistance thermometers. In this case, an influencing by the plate likewise does not take place.

According to an additional further development, the distance from the first sensor to the second sensor amounts to at least 6 mm, which, in turn, means that the separation of the central axes of the first and the second housings are likewise so distant. In additional examples of embodiments, the first and the second pin-shaped housings have an outer diameter of at least 2 mm, or the plate has an expanse along the longitudinal axis of at least 6 mm and/or the plate has an expanse along the vertical axis of at least 10 mm.

In an additional further development, the plate is arranged in the measuring tube in such a manner, that the longitudinal axis of the plate intersects at a point an imaginary connecting line between the first resistance thermometer (and especially its center of gravity) of the first sensor and the second resistance thermometer (and especially its center of gravity) of second sensor.

The object of the invention is achieved furthermore by a method for registering the flow and the flow direction of a measured medium in a measuring tube by means of a thermal, flow measuring device of the invention, wherein the thermal, flow measuring device has a first heatable resistance thermometer and at least a second heatable resistance thermometer, wherein measured values representing the temperature of the measured medium $T_{medium;actual}(t)$ are measured at the points in time $t=t_0, t_1, t_2, t_3, \ldots t_n$, with n being a natural number. The measured values representing the temperature of the measured medium—and thus the temperature of the measured medium—can, for example, be measured by the first, second or third sensor, depending on the embodiment of the thermal, flow measuring device. In such case, furthermore, a first instantaneous heating power $P_{1,1}(t_1)$ is consumed at a first point in time by the first heatable resistance thermometer, wherein a second instantaneous heating power $P_{2,2}(t_2)$ is consumed at a second point in time at the second heatable resistance thermometer, wherein the first heatable resistance thermometer provides a first measured value of the temperature $T_{1,heated;actual}(t=t_1)$ at the first point in time $t_1$, and a first coefficient $PC_1(t=t_1)$ representing the flow of the measured medium through the measuring tube is calculated as a function of the heating power $P_{1,1}(t_1)$ consumed by the first resistance thermometer, the temperature of the measured medium $T_{medium;actual}(t_1)$ and the temperature of the first heatable resistance thermometer $T_{1,heated;actual}(t_1)$, e.g. according to the formula $PC_1(t=t_1)= P_{1,1}(t_1)/T_{1,heated;actual}(t=t_1)-T_{medium;actual}(t=t_1))$, wherein the second heatable resistance thermometer provides a second measured value of the temperature $T_{2,heated;actual}(t=t_2)$ at the second point in time $t_2$, and a second coefficient $PC_2(t=t_2)$ is calculated as a function of the heating power $P_{2,2}(t_2)$ consumed by the second resistance thermometer, the temperature of the measured medium $T_{medium;actual}(t_2)$ and the temperature of the second heatable resistance thermometer $T_{2,heated;actual}(t_2)$, e.g. according to the formula $PC_2(t=t_2)= P_{2,2}(t_2)/(T_{2,heated;actual}(t=t_2)-T_{medium;actual}(t=t_2))$, and wherein a decision coefficient is calculated as a function of the first coefficient $PC_1(t_1)$ and the second coefficient $PC_2(t_2)$, e.g. according to the formula $DC=(PC_2-PC_1)/PC_2$, wherein the value of the decision coefficient indicates a flow of the measured medium in the measuring tube in a first direction, especially a direction parallel to the measuring tube axis, when the value the decision coefficients lies above a fixed limit value, and wherein the value of the decision coefficient indicates a flow the measured medium in the measuring tube in a second direction, again a direction parallel to the measuring tube axis, when the value of the decision coefficients lies below the fixed limit value, wherein the second direction points opposite to the first direction.

In a first further development of the method of the invention, the measured value of the temperature of the measured medium $T_{medium;actual}(t_1)$ at the first point in time is made available by the second heatable resistance thermometer or by the second sensor, and/or the measured value of the temperature of the measured medium $T_{medium;actual}(t_2)$ at the second point in time is measured by the first heatable resistance thermometer or the first sensor. Alternating heating periods are thus involved. The points in time $t_1$ and $t_2$ are thus especially different from one another, i.e. the first point in time and the second point in time are different points in time.

In another example, the measured value of the temperature of the measured medium $T_{medium;actual}(t)$ at the points in time t—thus especially at the first point in time $t_1$ and at the second point in time $t_2$—is measured by an additional temperature sensor, especially by a third resistance thermometer. The first resistance thermometer and the second resistance thermometer can then, at least for a short time interval, simultaneously be heated, and the points in time $t_1$ and $t_2$ can be equal, wherein, in an additional further development of the invention, the second heating power $P_{2,2}(t_2)$ consumed by the second heatable resistance thermometer at the point in time $t_2$ is fixed, or a fixed voltage drops at the second resistance thermometer, or a fixed voltage is present at the second resistance thermometer. This is sized independently of the temperature of the measured medium. The heating power is, according to $P=U^2/R$, dependent on the voltage U present or dropping at the resistance thermometer and on the resistance of the resistance thermometer R, which, for its own part, is dependent on the current temperature of the resistance thermometer, which, again, is dependent on the temperature of the measured medium and its curve as a function of time. The second sensor or the second resistance thermometer serves here only for decision making as regards the flow direction. Only with the assistance of the first resistance thermometer is flow measured. This thermometer is heated in a controlled manner and has previously been calibrated in the laboratory. The second resistance thermometer is heated without control.

Another further development provides that the limit value of the decision coefficient for deciding whether the flow is in the first direction or in the second direction is zero, especially if the first coefficient $PC_1(t_1)$ representing the flow of the measured medium through the measuring tube at the point in time $t_1$ is calculated according to the formula $PC_1(t_1)=P_{1,1}(t_1)/(T_{1,heated;actual}(t=t_1)-T_{medium;actual}(t=t_1))$, and if the coefficient $PC_2(t_2)$ representing the flow of the measured medium through the measuring tube at the point in time $t_2$ is calculated according to the formula $PC_2(t_2)=P_{2,2}(t_2)/(T_{2,heated;actual}(t=t_2)-T_{medium;actual}(t=t_2))$, wherein the decision coefficient is then calculated according to the formula $DC=(PC_1-PC_2)/PC_1$, and wherein then the limit value is zero.

The thermal, flow measuring device of the invention is especially used in industrial process measurements technology, in order, for example, to measure gases and/or liquids. In such case, specifications for limiting power, for the example for explosion protection, are often made and can be met.

BRIEF DESCRIPTION OF THE DRAWINGS

The invention will now be explained in greater detail on the basis of the appended drawing, the figures of which, in each case, present an example of an embodiment. Equal elements are provided with equal reference characters in the figures. The figures of the drawing show as follows.

DETAILED DISCUSSION IN CONJUNCTION WITH THE DRAWINGS

Figure 1:
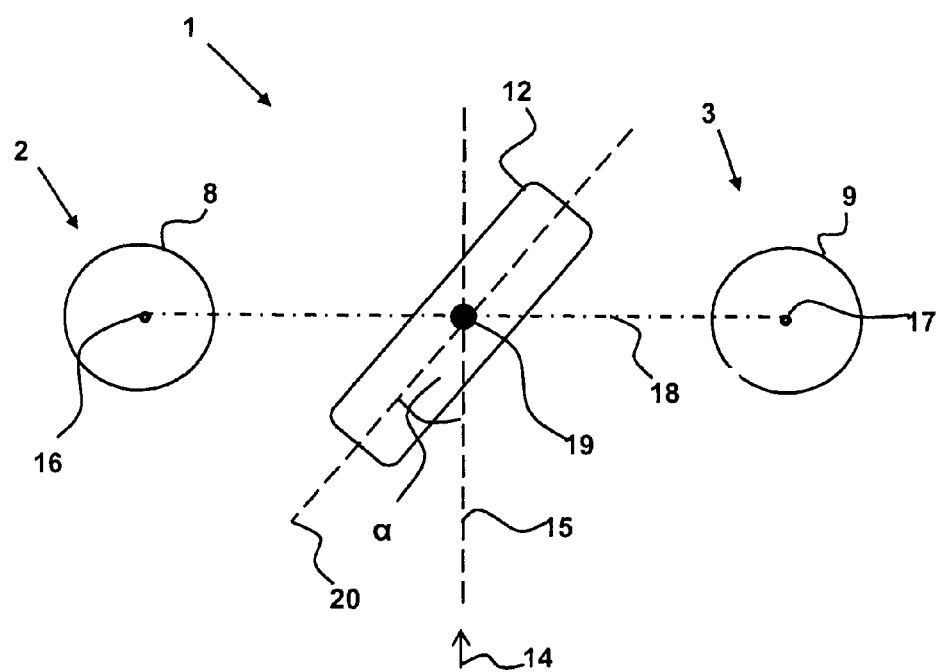
FIG. 1 is a sectional view of a thermal, flow measuring device of the invention.

FIG. 1 shows a thermal, flow measuring device of the invention 1 in plan view. Of the first sensor 2 and of the second sensor 3 of the thermal, flow measuring device 1, only the first housing 8 and the second housing 9 are shown. The section extends in a plane perpendicular to the central axes 16, 17 of the housings, so that the axes appear only as points. Arrow 14 shows the flow direction of the measured medium (not shown) in the measuring tube (not shown). The illustrated parts of the thermal, flow measuring device 1 are, however, located in a measuring tube in the installed state.

Between the housings 8 and 9 extends an imaginary connecting line 18. It corresponds in this example to the connecting line between the first and second resistance thermometers. It intersects the central axes 16, 17 of the housings 8, 9 approximately perpendicularly. In the center of the connecting line 18—here in a plane, in which lies the measuring tube axis 15, and which extends parallel to the central axes 16, 17 of the housings 8, 9—is the intersection of the vertical axis 19 and the longitudinal axis 20 of the flow-guiding body, here the plate 12. Since the vertical axis 19 intersects the plane of the drawing perpendicularly, and, consequently, shows only as a point, the representation of the vertical axis 19 coincides here with the representation of the intersection of the vertical and the longitudinal axes 19, 20. This is at the same time a point of symmetry here. The plate 12 is point-symmetrical to this intersection. Due to the symmetrical construction, the thermal, flow measuring devices of the invention 1 must only be calibrated for flow measurement in one flow direction. The second heatable resistance thermometer is only required for flow direction detection. The plate 12 has in this example an angle α of about 45° with the measuring tube axis 15, and therewith also with the connecting line 18 between the two housings 8, 9.

The resistance thermometers (which, for reasons of perspicuity, are not shown) are essentially arranged in the end sections or tips of the housings 8, 9, and the plate 12 lies between the resistance thermometers. A third sensor, which ascertains the temperature of the measured medium, is not shown here. This would be arranged in a region of the measuring tube, in which the flow of the measured medium is not or is no longer influenced by the plate 12.

A concept of this thermal, flow measuring device 1 is based on the local changes in the flow velocity of the measured medium in the measuring tube around the two sensors 2, 3, and the comparison of the two coefficients $PC_1$ and $PC_2$, as already described, with the decision coefficient $DC=(PC_2-PC_1)/PC_2$, which indicates the flow direction. The plate 12 distributes the flow locally in such a manner that the first sensor 2 is arranged in a flow which is here slowed. As a result of the plate 12, stagnation points of the flow are located at the plate 12 on the side containing the first sensor 2. The second sensor 3, in contrast, is arranged in the accelerated flow. In this example, the plate 12 has at both ends of its expanse along its longitudinal axis 20 two round ends, which help to accelerate the flow. The angle α of the plate 12 can, in the case of a changing flow velocity of the measured medium in the measuring tube, be changed and matched to the flow velocity.

The housings 8, 9 of the first and second sensors 2, 3 have the same diameter in this example. The distance between the two central axes 16, 17 of the housings amounts here to about 4.5 times this diameter, and the plate 12 has an expansion along its longitudinal axis 20 of about 3 times and along its vertical axis 19 of about 5 times this diameter. The thickness of the plate 12—thus its expanse perpendicular to the plane, which stretches through the longitudinal and vertical axes 19, 20—then amounts to about 0.5 times the diameter of the housings 8, 9. The already mentioned round ends of the plate 12 have a radius of 0.5 mm.

Figure 2:
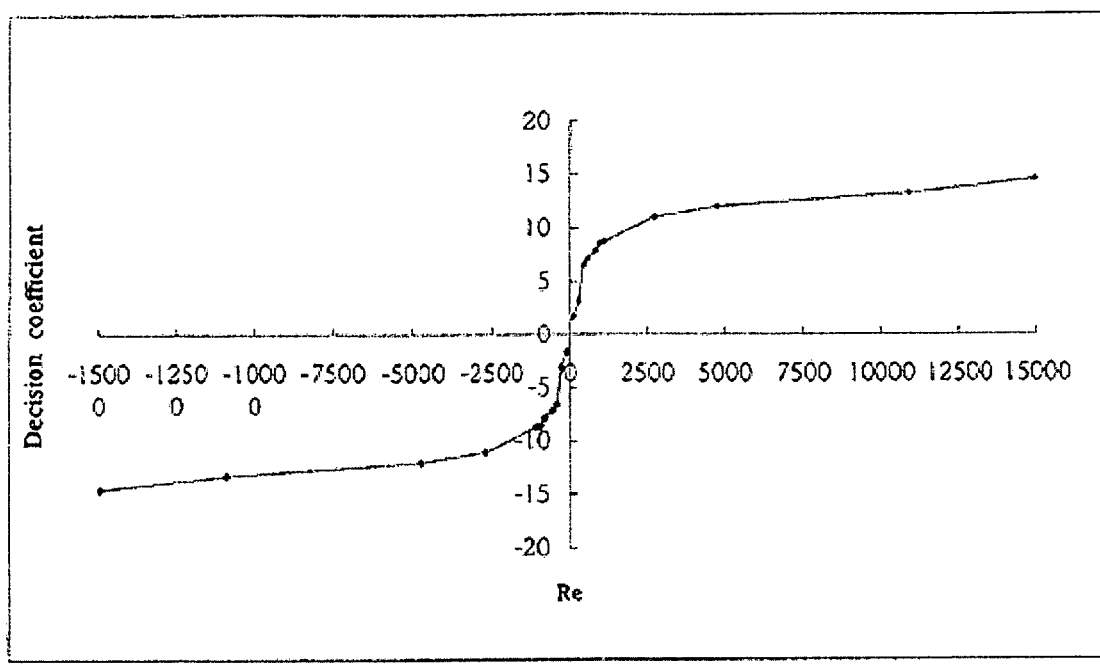
FIG. 2 is a graph of decision coefficient as a function of Reynolds number.

FIG. 2 presents a graph of the decision coefficient (DC) as a function of the Reynolds number (Re), here ranging from Re=minus 15000 to plus 15000. The limit value for the decision concerning whether a flow flows in the first direction shown in FIG. 1 or whether the flow flows in the direction opposite to this is 0. In the case of slow flows, the values for the opposing flow directions approach one another. In the case of fast flows, the values for the decision concerning flow direction lie, in contrast, far apart.

For all embodiments, the method for operating a thermal, flow measuring device of the invention provides method steps as follows:

A first resistance thermometer of a first sensor is heated during a first heating period, it is fed a first amount of heat energy, and the heating power consumed by the first resistance thermometer is ascertained at a first point in time. Additionally, a second resistance thermometer of a second sensor is heated during a second heating period with a second amount of heat energy, and the heating power consumed by the second resistance thermometer is ascertained at a second point in time. A measured value of the temperature of the measured medium in the measuring tube is present both for the first point in time, as well as for the second point in time.

This measured value of temperature of the measured medium can, in alternating operation, be in each case measured by the unheated sensor at the first and second points in time, or a further sensor is provided in the measured medium for determining the temperature of the measured medium at the first and second points in time. In the first case, the first point in time is not equal to the second point in time. In the second case, the second point in time can coincide with the first point in time—the heating powers of the first and second sensor are ascertained at the same point in time.

The first heating power for the first point in time is placed over the difference of the temperature value of the heated first resistance thermometer at the first point in time and the measured value of the temperature of the measured medium at the first point in time. Analogously, the difference of the temperature of the second heated resistance thermometer at the second point in time and the temperature of the measured medium measured at the second point in time is divided into the instantaneous power of the second resistance thermometer at the second point in time. Resulting from this are thus two coefficients for two points in time, which, as indicated above, can, depending on embodiment, be equal to or different from one another.

An essential feature this method lies in the fact that only the first sensor is taken into consideration for flow measurement. The first coefficient is a coefficient reflecting the flow at the first point in time. The first heating power can, for reasons of explosion protection, be limited, e.g. to 256 mW. Naturally, the second heating power is then also correspondingly limited. The first heating power is controlled. Usually, a desired temperature difference between the heated and unheated resistance thermometers is set, e.g. 10K. It is, however, according to $P=U^2/R$, wherein U is the voltage dropping at the resistance thermometer and R is the resistance of the resistance thermometer, also dependent on the resistances of the resistance thermometers, which, for their own part, are again dependent on the temperature. The second heating power is, in contrast, not controlled with regard to a desired temperature difference between second heated resistance thermometer and the corresponding unheated resistance thermometer of the first or third sensor. For example, it is set by a fixed peak voltage or a peak power of a certain size.

By means of the two calculated coefficients, a decision coefficient is formed. The first coefficient is subtracted from the second coefficient and divided by the second coefficient. Naturally, subtraction of the second coefficient from the first coefficient is also possible, wherein the result is then divided by the first coefficient. Depending on the embodiment of the thermal, flow measuring device of the invention used, the limit values then shift, as those skilled in the art will appreciate.

In addition to the volume and/or mass flow, the flow direction of a measured medium in a measuring tube can also be registered therewith.

The invention claimed is:

1. A thermal, flow measuring device for determining and/or monitoring flow of a measured medium through a measuring tube defining a measuring tube axis, comprising:
   a first heatable resistance thermometer;
   a second heatable resistance thermometer, both of which lie in a plane which is essentially perpendicular to said measuring tube axis; and
   a plate arranged in the measuring tube on a connecting line between said first heatable resistance thermometer and said second heatable resistance thermometer, wherein:
   said plate has a vertical axis and a longitudinal axis;
   said plate is arranged in the measuring tube in such a manner, that said longitudinal axis forms a first angle ($\alpha$) of between 30° and 60° with said measuring tube axis, and the vertical axis intersects the connecting line approximately perpendicularly and intersects the plane at a second angle ($\beta$) of between −30° and +30°.

2. The thermal, flow measuring device as claimed in claim 1,
   wherein:
   said plate is positioned so as to be rotatable about its vertical axis; and
   said first angle ($\alpha$) is variable as a function of the measured flow velocity.

3. The thermal, flow measuring device as claimed in claim 1, further comprising:
   a third resistance thermometer, by means of which temperature of the measured medium is measurable.

4. The thermal, flow measuring device as claimed in claim 3,
   wherein:
   said third resistance thermometer is arranged in the measuring tube;
   the distance of said third resistance thermometer from said first resistance thermometer amounts to at least 5 times the distance of said first resistance thermometer from said second resistance thermometer.

5. The thermal, flow measuring device as claimed in claim 3,
   wherein:
   said third resistance thermometer is arranged in the measuring tube in such a manner, that it intersects measuring tube axis.

6. The thermal, flow measuring device as claimed in claim 1, wherein:
   said first and said second resistance thermometers are arranged in the measuring tube in such a way, that the distance of said first resistance thermometer from said second resistance thermometer amounts to at least 9 mm.

7. The thermal, flow measuring device as claimed in claim 1, further comprising:
   a first pin-shaped housing surrounding said first resistance thermometer;
   a second pin-shaped housing surrounding said second resistance thermometer, and said first and said second pin-shaped housings have an outer diameter of at least 2 mm.

8. The thermal, flow measuring device as claimed in claim 1, wherein:
   said plate has an expanse along the longitudinal axis of at least 6 mm, and/or that said plate has an expanse along the vertical axis of at least 10 mm.

9. A method for registering flow and flow direction of a measured medium in a measuring tube with a thermal, flow measuring device including a thermal, flow measuring device for determining and/or monitoring flow of a measured medium through a measuring tube defining a measuring tube axis, comprising: a first heatable resistance thermometer; a second heatable resistance thermometer, both of which lie in a plane which is essentially perpendicular to said measuring tube axis; and a plate arranged in the measuring tube on a connecting line between said first heatable resistance thermometer and said second heatable resistance thermometer, wherein: said plate has a vertical axis and a longitudinal axis; and said plate is arranged in the measuring tube in such a manner, that said longitudinal axis forms a first angle ($\alpha$) of between 30° and 60° with said measuring tube axis, and the vertical axis intersects the connecting line approximately perpendicularly and intersects the plane at a second angle ($\beta$) of between −30° and +30°, the method comprising the steps of:
   producing measured values $T_{medium;actual}(t)$ representing temperature of the measured medium at points in time $t=t_0, t_1, t_2, t_3, \ldots t_n$, with $n \in N$,
   at the point in time $t_1$ a first heating power ($P_1$) is consumed by the first heatable resistance thermometer $P_{1,1}(t_1)$,
   at the point in time $t_2$ a second heating power ($P_2$) is consumed by the second heatable resistance thermometer $P_{2,2}(t_2)$;

the first heatable resistance thermometer provides a first measured value of temperature $T_{1,heated;actual}(t=t_1)$ at a point in time $t_1$;

and a first coefficient $PC_1(t=t_1)$ representing flow of the measured medium through the measuring tube calculated as a function of the heating power $P_{1,1}(t_1)$ consumed by the first resistance thermometer, the temperature of the measured medium $T_{medium;actual}(t_1)$ and the temperature of the first heatable resistance thermometer $T_{1,heated;actual}(t_1)$;

the second heatable resistance thermometer provides a second measured value of the temperature $T_{2,heated;actual}(t=t_2)$ at a point in time $t_2$;

a second coefficient $PC_2(t=t_2)$ calculated as a function of the heating power $P_{2,2}(t_2)$ consumed by the second resistance thermometer, the temperature of the measured medium $T_{medium;actual}(t_2)$ and the temperature of the second heatable resistance thermometer $T_{2,heated;actual}(t_2)$;

a value of a decision coefficient is calculated as a function of the first coefficient $PC_1(t_1)$ and the second coefficient $PC_2(t_2)$;

the value of the decision coefficient (DC) indicates flow of the measured medium in the measuring tube in a first direction when the value of the decision coefficient (DC) lies above a fixed limit value;

the value of the decision coefficient (DC) indicates flow of the measured medium in the measuring tube in a second direction when the value of the decision coefficient (DC) lies below the fixed limit value; and the second direction is opposite to the first direction.

10. The method as claimed in claim 9, further comprising the step of:
providing the measured value of the temperature of the measured medium $T_{medium;actual}(t_1)$ at the point in time $t_1$ by the second heatable resistance thermometer and/or providing the measured value of the temperature of the measured medium $T_{medium;actual}(t_2)$ at the point in time $t_2$ by the first heatable resistance thermometer.

11. The method as claimed in claim 9, wherein:
the measured value of the temperature of the measured medium $T_{medium;actual}(t)$ at the points in time t is provided by the third sensor.

12. The method as claimed in claim 9, wherein:
$t_1 \neq t_2$.

13. The method as claimed in claim 9, wherein:
$t_1 = t_2$.

14. The method as claimed in claim 9, wherein:
the first coefficient $PC_1(t_1)$ representing the flow of the measured medium through the measuring tube at the point in time $t_1$ is calculated according to the formula $PC_1(t_1)=P_{1,1}(t_1)/(T_{1,heated;actual}(t=t_1)-T_{medium;actual}(t=t_1))$, and the coefficient $PC_2(t_2)$ representing the flow of the measured medium through the measuring tube at the point in time $t_2$ is calculated according to the formula $PC_2(t_2)=P_{2,2}(t_2)/(T_{2,heated;actual}(t=t_2)-T_{medium;actual}(t=t_2))$; and
the decision coefficient is calculated according to formula $DC=(PC_1-PC_2)/PC_1$ and the limit value is zero.

15. The method as claimed in claim 9, wherein:
the second heating power $P_{2,2}(t_2)$ consumed by the second heatable resistance thermometer at the point in time $t_2$ is fixed, or that the voltage dropping at the second heatable resistance thermometer is fixed.

* * * * *